US012619885B2

(12) United States Patent
Lawrence et al.

(10) Patent No.: US 12,619,885 B2
(45) Date of Patent: May 5, 2026

(54) METHOD FOR OPERATING A NEURAL LINK PREDICTION MODEL AND A CORRESPONDING SYSTEM

(71) Applicant: NEC Laboratories Europe GmbH, Heidelberg (DE)

(72) Inventors: Carolin Lawrence, Heidelberg (DE); Timo Sztyler, Heidelberg (DE); Mathias Niepert, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 821 days.

(21) Appl. No.: 17/762,400

(22) PCT Filed: Aug. 4, 2020

(86) PCT No.: PCT/EP2020/071923
§ 371 (c)(1),
(2) Date: Mar. 22, 2022

(87) PCT Pub. No.: WO2021/244766
PCT Pub. Date: Dec. 9, 2021

(65) Prior Publication Data
US 2022/0366274 A1    Nov. 17, 2022

(30) Foreign Application Priority Data

Jun. 4, 2020    (EP) .................................... 20178215

(51) Int. Cl.
*G06N 5/022* (2023.01)
*G06N 5/045* (2023.01)

(52) U.S. Cl.
CPC ............. *G06N 5/022* (2013.01); *G06N 5/045* (2013.01)

(58) Field of Classification Search
CPC ......... G06N 5/022; G06N 5/045; G06N 20/00
See application file for complete search history.

(56) References Cited

U.S. PATENT DOCUMENTS

| | | | | |
|---|---|---|---|---|
| 8,990,234 B1 * | 3/2015 | Myslinski | .............. | G06N 5/047 |
| | | | | 707/758 |
| 10,977,573 B1 * | 4/2021 | Dalton | .................... | G06F 16/80 |

(Continued)

OTHER PUBLICATIONS

Cheng, Weiyu & Shen, Yanyan & Zhu, Yanmin & Huang, Linpeng. Explaining Latent Factor Models for Recommendation with Influence Functions. 10.48550/arXiv.1811.08120. (Year: 2018).*

(Continued)

*Primary Examiner* — Abdullah Al Kawsar
*Assistant Examiner* — Gisel Gabriela Faccenda
(74) *Attorney, Agent, or Firm* — Leydig, Voit & Mayer, Ltd.

(57) ABSTRACT

A method for operating a neural link prediction model includes training a neural link predictor of the neural link prediction model using a knowledge base of facts. During the training: a fact (training triple) is processed by the neural link predictor to obtain a behavior or prediction, parameters are updated based on the behavior or the prediction, an influence indicating a change of the parameters caused by the training triple is determined, and is collected and stored. Subsequent to training, the trained neural link predictor is provided for use in maintaining the knowledge base of facts. Embodiments of the present disclosure can facilitate decision-making by using machine learning (e.g., help a user make a decision) and can be used in a variety of applications including, but not limited to, several use cases in drug development for medical/healthcare, fact checking of news, and/or product recommendation.

18 Claims, 1 Drawing Sheet

(56) References Cited

U.S. PATENT DOCUMENTS

| | | | |
|---|---|---|---|
| 11,381,663 B1 * | 7/2022 | Vega ........................ | G06F 9/541 |
| 2009/0192968 A1 * | 7/2009 | Tunstall-Pedoe ........ | G06N 5/02 |
| | | | 706/53 |
| 2016/0147799 A1 * | 5/2016 | Cohen ................. | G06F 16/2365 |
| | | | 706/12 |

OTHER PUBLICATIONS

Nickel, Maximilian et al. "A Review of Relational Machine Learning for Knowledge Graphs." Proceedings of the IEEE 104: 11-33. (Year: 2015).*

Garima, Frederick Liu, Satyen Kale, and Mukund Sundararajan. Estimating training data influence by tracing gradient descent. arXiv:2002.08484v1 (Year: 2020).*

Pouya Pezeshkpour, Yifan Tian, Sameer Singh. Investigating Robustness and Interpretability of Link Prediction via Adversarial Modifications. arXiv:1905.00563v1 (Year: 2019).*

Cheng, et al., "Explaining Latent Factor Models for Recommendation with Influence Functions," *Cornell University Library*, pp. 1-8, Nov. 20, 2018, Cornell University Press, Ithaca, NY, USA.

Liang, et al., "Machine Learning for Security and the Internet of Things: The Good, the Bad, and the Ugly," *IEEE Access 7*, pp. 158126-158147, Nov. 12, 2019, Institute of Electrical and Electronics Engineers, Piscataway, NJ, USA.

Schulam, et al., "Can You Trust this Prediction? Auditing Pointwise Reliability After Learning," *Cornell University Library*, pp. 1-10, Jan. 2, 2019, Cornell University Press, Ithaca, NY, USA.

Shokri, et al., "Privacy Risks of Explaining Machine Learning Models," *Cornell University Library*, pp. 1-16, Jun. 29, 2019, Cornell University Press, Ithaca, NY, USA.

* cited by examiner

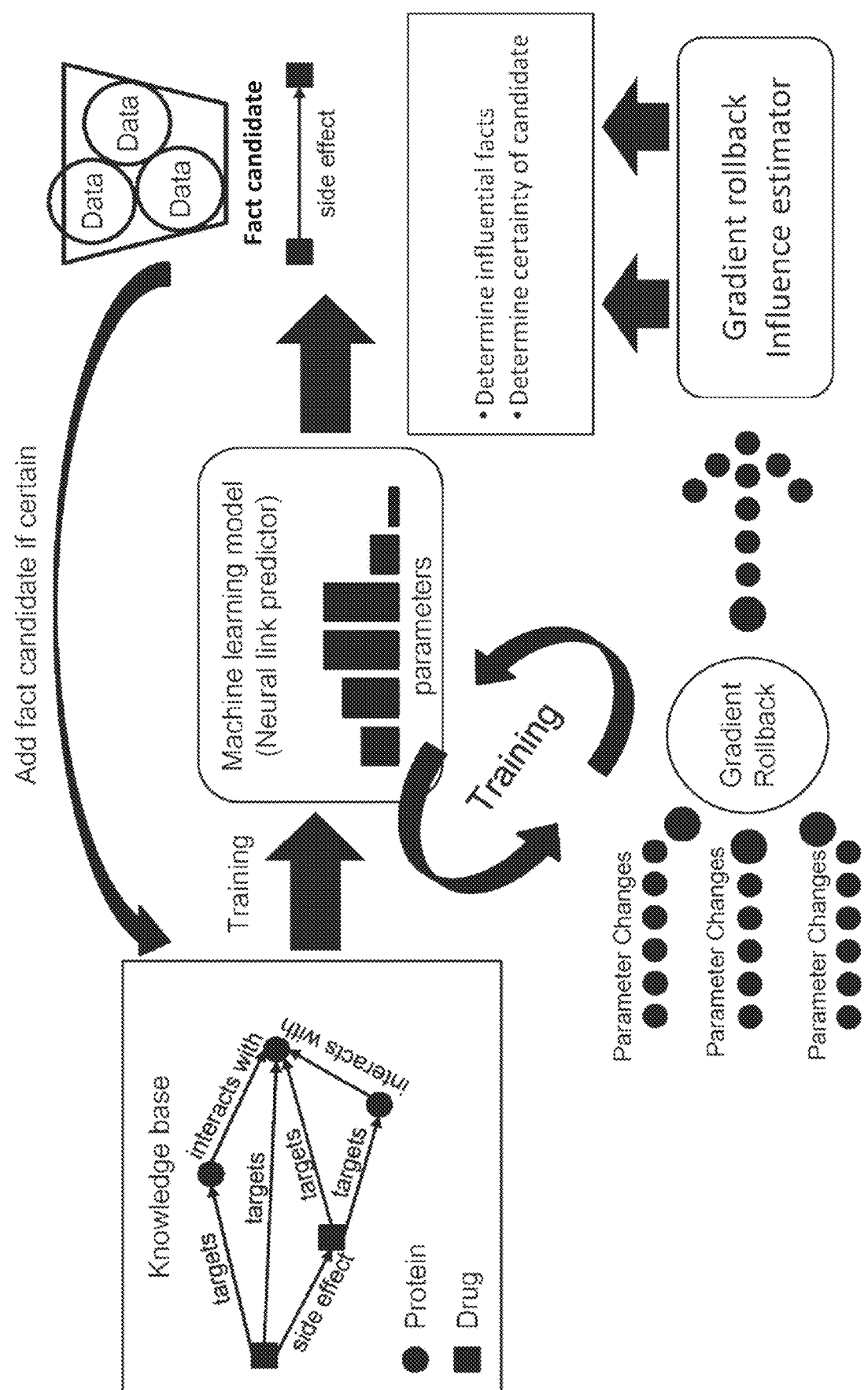

METHOD FOR OPERATING A NEURAL LINK PREDICTION MODEL AND A CORRESPONDING SYSTEM

CROSS REFERENCE TO RELATED APPLICATIONS

This application is a U.S. National Phase application under 35 U.S.C. § 371 of International Application No. PCT/EP2020/071923, filed on Aug. 4, 2020, and claims benefit to European Patent Application No. EP 20178215.8, filed on Jun. 4, 2019. The International Application was published in English on Dec. 9, 2021, as WO 2021/244766 A1 under PCT Article 21(2).

FIELD

Embodiments of the present invention relate to a method for operating a neural link prediction model, and a system for operating a neural link prediction model.

BACKGROUND

A neural link prediction model can be a machine learning model that predicts the probability of a new fact given the already existing facts in the knowledge base.

Corresponding prior art documents are listed as follows:

Moritz Hardt, Benjamin Recht, and Yoram Singer. Train faster, generalize better: Stability of stochastic gradient descent. In Proceedings of the 33rd International Conference on International Conference on Machine Learning (ICML), page 1225-1234, 2016.

Pouya Pezeshkpour, Yifan Tian, and Sameer Singh. Investigating robustness and interpretability of link prediction via adversarial modifications. In Annual Conference of the North American Chapter of the Association for Computational Linguistics (NAACL), 2019.

Koh, Pang Wei, and Percy Liang. "Understanding black-box predictions via influence functions." In Proceedings of the 34th International Conference on Machine Learning-Volume 70, pp. 1885-1894. JMLR. org, 2017.

Estimating the influence of training examples on a machine learning model's behavior or a neural link prediction model's behavior is an important problem. For instance, it can be used for identifying training examples most responsible for a given prediction and, therefore, faithfully explain the output of a black-box model to a user. Besides providing an understanding of model behavior, it can also be used to find adversarial examples, to uncover domain mismatch, and to determine incorrect or mislabeled examples.

SUMMARY

In an embodiment, the present disclosure provides a method for operating a neural link prediction model. The method includes training a neural link predictor of the neural link prediction model using a knowledge base of facts, estimating an influence of at least one fact—being provided to the neural link predictor—on a behavior or prediction of the neural link predictor, collecting and storing the influence of the at least one fact on at least one parameter of the neural link predictor during training in a memory. The influence is expressed by a change in a value of the at least one parameter.

BRIEF DESCRIPTION OF THE DRAWINGS

Subject matter of the present disclosure will be described in even greater detail below based on the exemplary figures.

All features described and/or illustrated herein can be used alone or combined in different combinations. The features and advantages of various embodiments will become apparent by reading the following detailed description with reference to the attached drawings, which illustrate the following:

FIG. 1 shows in a diagram an overview of an embodiment of the proposed invention.

DETAILED DESCRIPTION

Embodiments of the present invention relate to maintaining a knowledge base of facts, such as "Protein X is targeted by Drug Y" or "COVID-19 has symptom Cough." The knowledge base can be used to find documents that are factually wrong, e.g., statements in the document that contradict what is in the knowledge base—fact checking—, or can be used to answer questions about biological processes, e.g., "What drug could be useful for disease X?". One problem is that the knowledge base should remain up to date and ingest new data while at the same time making sure that the newly added facts are correct.

Embodiments of the present invention provide a method for operating a neural link prediction model, wherein a knowledge base of facts is used for training a neural link predictor of the neural link prediction model, wherein an influence of at least one fact—being provided to the neural link predictor—on a behavior or prediction of the neural link predictor is estimated, wherein the influence of the at least one fact on at least one parameter of the neural link predictor during training is collected and stored within a memory, wherein the influence is expressed by a change in a value of the at least one parameter.

Embodiments of the present invention provide a system for operating a neural link prediction model. The system includes a knowledge base of facts for training a neural link predictor of the neural link prediction model, wherein an influence of at least one fact—being provided to the neural link predictor—on a behavior or prediction of the neural link predictor is estimated by an estimating means. The system further includes collecting and storing means for collecting and storing the influence of the at least one fact on at least one parameter of the neural link predictor during training within a memory, wherein the influence is expressed by a change in a value of the at least one parameter.

According to embodiments of the present invention, it has been recognized that it is possible to provide a high prediction performance of the method by simply collecting and storing the influence in a smart way. It has been further recognized that collecting and storing this influence expressed by a change in the value of the at least one parameter is a very simple means for solving the above object. On the basis of the stored changed values various predictions can be performed depending on the individual situation. For example, the reliability of learning based knowledge base inferences can be estimated.

According to an embodiment of the present invention, gradient rollback can be performed within the method and system. Gradient rollback is a method for assessing whether a neural link prediction model's prediction is sound. The neural link prediction model or a neural matrix factorization model can be trained using Stochastic Gradient Descent, SGD, to update the model's weights based on training triples from the training set. After each SGD update, gradient rollback stores for each training triple how much this training triple changed the weights: this is called the influence of a training example. Once the model is trained, the model can make predictions, where a triple is past to the model with at last one of the parts in the triple missing. Prediction of the model can be explained based on the information gradient rollback has stored during training: for each prediction, gradient rollback checks for each training example, how much the prediction would change if this training example's influence where removed from the model. Based on this gradient rollback can return a list of training examples and how important each training example was in order for the model to produce the current prediction.

In an embodiment, the stored change in a value of the at least one parameter is aggregated and/or computed into an influence score between already existing facts of the knowledge base and at least one new fact. Alternatively, the stored change in a value of the at least one parameter is aggregated and/or computed into an influence score for each fact with respect to a prediction with regard to the at least one new fact. Such an influence score can be used for different purposes in the method or system for operating a neural link prediction model.

According to an embodiment of the present invention, on the basis of the influence score the already existing facts are determined that support or contradict a prediction of the neural link predictor with regard to the at least one new fact.

In an embodiment, it is determined whether a new fact has enough evidence or support by already existing facts. The certainty of a new fact can be determined within such an embodiment.

According to an embodiment, if few facts have a large influence on the prediction, the prediction is considered less certain than if there are several facts that have a moderate influence on the prediction.

In an embodiment, the probability that a new fact is correct or false is predicted. This probability can form the basis for a decision regarding an update of the knowledge base by incorporating the new fact into the knowledge base.

According to an embodiment, if the probability is low that a new fact is certain, a user is informed about this low probability regarding this new fact and/or this new fact is presented along with existing facts most influential in the prediction, in an interpretable manner to the user. This information is useful in explaining the prediction performance of the method and system.

In an embodiment, the probability that a new fact can be added to the knowledge base as being a certain fact is predicted, preferably for automatically updating the knowledge base.

According to an embodiment, the process of collecting and storing the change in a value of the at least one parameter can be performed after individual time intervals or in response to a request by a user. In an embodiment, collecting and storing the change in a value of the at least one parameter is done during a retraining of the neural link predictor.

In an embodiment, a preferably bi-partite graph between the at least one fact and the at least one parameter of the neural link predictor is generated. This form of representation is useful in explaining model predictions to human users.

In an embodiment, for providing a simple processing of the at least one fact, the at least one fact is provided in the form of a training triple. Such a triple consists of three elements. For example a head, a relation and a tail. They can be used to encode knowledge, for example (Obama, born_in, Hawaii).

There are many possibilities in applying the method and system according to various embodiment of the present invention. In an embodiment of the present invention, the method can be applied to question answering systems, preferably biomedical question answering systems. According to other embodiments, the method can be applied to fact checking systems and/or to recommender systems.

Embodiments of the present invention can introduce a method and system for explaining neural link prediction models. It can be used to provide explanations for model predictions to human users and/or to maintain and update a knowledge base of facts automatically. It is applicable to embodiments such as biomedical question answering systems, "Which drug will likely upregulate protein X?", fact checking systems, "Is there a false statement in the news report?" and recommender systems, "What product would customer X like the most?"

Embodiments of the present invention can estimate the certainty of a new fact being true or false. If the method determines that the certainty of the new fact is low, it can present the fact along with existing facts most influential in the prediction, in an interpretable manner to the user. If it is certain that a new fact is true, it can automatically add it to the knowledge base. Hence, the invention is applicable in all embodiments in which a knowledge base of fact is maintained.

Some advantages of the embodiments of the present invention are summarized as follows:

An embodiment provides a method to collect and sparsely—memory efficiently—store parameter changes caused by each training fact on the machine learning model's parameters.

At test time, when deciding whether a new fact is correct, and embodiment provides a method for aggregating the recorded changes in parameter values into influence scores between training facts and the new fact so as to determine efficiently the existing knowledge base facts that support and/or contradict the prediction of the machine learning model.

An embodiment provides a method to determine whether a new fact has enough evidence/support based on the facts determined by gradient rollback to be influential to the prediction of the machine learning model. If few facts have a large influence—according to gradient rollback—on the prediction according to an embodiment the prediction is considered less certain than if there are several facts that have a moderate influence—according to gradient rollback—on the prediction.

An embodiment provides a method for estimating the influence of a training example or fact on the behavior of a machine learning model or neural link predictor. More specifically, according to a further embodiment the influence of a fact in a knowledge base on the behavior of a neural link prediction model when predicting the probability/likelihood of a new fact to be added to the knowledge base can be estimated or determined.

An embodiment of a corresponding method can comprise one or more of the following aspects and/or features:

1) A knowledge base with a set of known facts.
2) A machine learning method or neural link prediction method that is trained on these facts to be able to predict the probability that a new fact is correct or false.
3) The method of gradient rollback collects and stores in a memory efficient manner the change in parameters each training fact causes to the model. This can be done during training or retraining of the model.
4) At test time, when the machine learning model is used to predict whether a new fact is correct, gradient rollback aggregates the recorded changes and computes an influence score for each fact with respect to the prediction. It can then for example return all training instances that, if removed, would cause a drop in probability for this prediction. This can be done in several exemplary ways, two of which are described below:

a. Given is a model and its prediction. For each training instance, remove its influence from the model's original parameters and re-compute the prediction. Record the change and rank all training instances accordingly.

b. Given is a model and its prediction. For the all gradients of the prediction, compute the dot product between the gradient and its corresponding counterpart in the training instance's influence vector. Training examples have a higher influence on a prediction the higher the dot product value is.

5) The number and magnitude of facts and their influence scores is used to determine whether a new triple is automatically added to the knowledge base or presented to a user for verification.

Conventional methods for influence estimation does not keep track of the impact or influence each training example or fact has on the parameters of the underlying machine learning model or neural link predictor. The related work are influence functions which do not scale to large machine learning models. In contrast to a recent method for knowledge base link prediction, embodiments with gradient rollback can find influential training examples of facts that are less constrained with respect to the fact that one ought to explain.

Embodiments of the method can be highly efficient for the problem of estimating influence of training triples or facts on the behavior of the machine learning model or neural link predictor under consideration. Conventional methods do not scale to larger datasets or do not have the same functionality.

In this document the terms "training triple" and "training instance" are used as synonyms for the "fact" which can be used for training the neural link predictor.

There are several ways how to design and further develop the teaching of the present invention in an advantageous way. To this end it is to be referred to the following explanation of examples of embodiments of the invention, illustrated by the drawing. In the drawing Embodiments of present invention provide a method to estimate the influence a training example or fact has on the behavior of a knowledge base inference model. It is used as a part in a system that is able to automatically grow the knowledge base and improve its prediction performance. An embodiment of the system is based on a knowledge base consisting of facts such as "Drug X targets Protein Y." Given such a knowledge base, a machine learning model—often referred to as a neural link prediction model or neural link predictor—is trained. During training, the method keeps track of the influence the examples had on the change to the parameters. this can be done efficiently and with a low resource overhead. Every update to the model based on a training fact is recorded in an efficient manner.

Once the model is trained, it can automatically predict the probability of new facts that could potentially be added to the knowledge base. The method can now check which of the training facts had a large influence on the prediction. If the prediction is based only on one or a small number of facts, and removing those would reverse the prediction, the model concludes that it is uncertain about the prediction. In this case, the fact and a user-friendly explanation can be provided to a human operator. The operator can decide if the fact should be added to the knowledge base or be discarded. The decision can be recorded and the model updated accordingly. If the method for influence estimation verifies that a large number of fact robustly supports the prediction of a fact, said fact can be automatically added to the knowledge base and the neural link prediction model updated.

Aspects of the method include: (a) it keeps track of the influence each training fact or training triple has on the parameters of a machine learning system during learning and it can build implicitly a bi-partite graph between the training facts or training triples and the parameters of the learning system, and (b) at test time, given a new fact that needs to be verified—either added to the knowledge base or discarded —, it uses the recorded influence values for each of the training facts or training triples to compute an overall influence score each training fact or training triple has had on the prediction of the new fact. An embodiment of the method can introduce a general way of aggregating influence scores into a score that can be used to determine the most influential knowledge base fact for each prediction. Moreover, embodiments of the present invention can also include an approximation of the aggregated influence scores.

FIG. 1 shows in a diagram an overview of a method and a system according to some embodiments of the present invention that supports machine learning models or neural link predictors for the verification of new fact candidates using gradient rollback. Gradient rollback ingests parameter changes of the machine learning model or neural link predictor during training and stores the changes each fact caused during training. At test time, the prediction of a new fact candidate is assessed using gradient rollback.

Three exemplary embodiments relate to drug development with biomedical knowledge graphs, fact checking systems for spotting misinformation in text documents, and recommender systems to propose products to customers that they are likely to be interested in.

Drug Development with Knowledge Graphs and Gradient Rollback

Two problems in drug development are polypharmacy prediction and drug repurposing. The former is concerned with determining, for any pair of drugs, what side-effects they might cause in patients that one would not encounter were the drugs taken individually. The second problem is concerned with the problem of determining for approved drugs, e.g. from the Food and Drug Administration, FDA, whether they might be useful for treating other diseases. Knowledge graphs—knowledge bases of facts—have been used for both problems. The facts in the knowledge base include statements such as "Drug X upregulates Protein Y" and "Protein A interacts with Protein B." In addition, known side effects "Drug A causes headache when taken with Drug B." Both problems above amount to finding new facts in the form of links between drugs or between drugs and proteins participating in diseases. Embodiments of the present invention can be applied to these use cases. The methods and systems would verify possible predictions and find the most probable and supported predictions by utilizing the influence scores computed by gradient rollback.

Fact Checking of News on the Internet and Social Media

Knowledge bases of facts—knowledge graphs—are often used in so-called fact checking systems. These systems extract from news articles—or other types of text content—statements that are expressed in the document. For instance, one might extract the possible fact "COVID-19 side effect hair loss". There exist knowledge bases of facts that are known to be true about certain topics and themes. Embodiments of the method could be used to check the support of existing facts for a new fact extracted from a text document. Gradient rollback and the proposed system would be able to determine how likely it is that a new fact is true based on the supporting facts in the knowledge graph and their influence scores on the prediction for the new fact. If the model is certain, the fact can be added to the knowledge base. If not, it can be presented, together with more context information, to a user who could validate the extracted fact.

Product Recommendation Systems

A product recommendation system keeps track of all products and which customers have liked and purchased which products. Note that this can be represented as a knowledge base of fact of the type "Customer A purchased Product B" and "Customer A rated 4 star Product B." Machine learning models for recommender systems, which predict, for a given customer, which other product she might like to purchase, are often based on neural link predictions models as the ones gradient rollback can be used with. Here, gradient rollback could compute explanations for other products the user might like and use that information to advertise the product to the customer.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A computer-implemented method for operating a neural link prediction model, the method comprising:

training a neural link predictor of the neural link prediction model using a knowledge base comprising a plurality of facts;

during the training of the neural link predictor of the neural link prediction model:

processing the plurality of facts by the neural link predictor to obtain behaviors or predictions, wherein the plurality of facts comprises a plurality of training triple, updating parameters of the neural link predictor based on the behaviors or the predictions, based on updating the parameters of the neural link predictor, determining changes of the parameters of the neural link predictor that are caused by the plurality of training triples, and collecting and storing the changes of the parameters of the neural link predictor that are caused by the plurality of training triples in a memory; and subsequent to the training of the neural link predictor, obtaining a new fact candidate;

generating a candidate prediction for the new fact candidate using the trained neural link predictor of the neural link prediction model;

based on the changes of the parameters of the neural link predictor that are stored in the memory and associated with the plurality of training triples, determining one or more facts from the plurality of facts of the knowledge base that reverses the generated candidate prediction for the new fact candidate when removed by:

removing a change of the parameters of the neural link predictor from the changes of the parameters that are stored in the memory, wherein the change is associated with a first fact from the plurality of facts of the knowledge base;

based on removing the change, determining a new candidate prediction; and determining the first fact reverses the generated candidate prediction for the new fact candidate based on the new candidate prediction; and maintaining the knowledge base of the plurality of facts based on the one or more determined facts.

2. The computer-implemented method according to claim 1, wherein the changes of the parameters are aggregated and/or computed into an influence score between the plurality of facts that already exist in the knowledge base and the new fact candidate or into an influence score for each fact of the plurality of facts with respect to the candidate prediction with regard to the new fact candidate.

3. The computer-implemented method according to claim 2, wherein on the basis of the influence score, the plurality of facts in the knowledge base are determined that support or contradict the candidate prediction of the neural link predictor with regard to the new fact candidate.

4. The method according to claim 1, wherein maintaining the knowledge base comprises determining whether the new fact candidate has enough evidence or support from the plurality of facts of the knowledge base.

5. The computer-implemented method according to claim 1, wherein maintaining the knowledge base is based on predicting a probability that the new fact candidate is correct or false.

6. The computer-implemented method according to claim 1, wherein maintaining the knowledge base is based on predicting a probability that the new fact candidate can be added to the knowledge base as being a certain fact, wherein the probability that the new fact candidate is the certain fact is based on the one or more facts from the plurality of facts of the knowledge base that reverses the generated candidate prediction for the new fact candidate when removed.

7. The computer-implemented method according to claim 1, wherein collecting and storing the changes in the parameters is performed during a retraining of the neural link predictor.

8. The computer-implemented method according to claim 1, wherein a bi-partite graph between the plurality of facts and the parameters of the neural link predictor is generated.

9. The computer-implemented method according to claim 1, wherein updating the parameters of the neural link predictor comprises performing a Stochastic Gradient Descent (SGD) to update the parameters of the neural link predictor.

10. The computer-implemented method according to claim 1, wherein the method is applied to question answering systems or fact checking systems.

11. The computer-implemented method according to claim 10, wherein the question answering systems are biomedical question answering systems.

12. The computer-implemented method according to claim 1, wherein the method is applied to recommender systems.

13. The computer-implemented method of claim 1, wherein maintaining the knowledge base of the plurality of facts comprises:

including the new fact candidate in the knowledge base based on the candidate prediction.

14. The computer-implemented method of claim 13, wherein maintaining the knowledge base of the plurality of facts further comprises:

determining a candidate prediction change in the candidate prediction based on the changes of the parameters of the neural link predictor that are stored in the memory; and comparing the candidate prediction change with one or more thresholds, wherein including the new fact candidate in the knowledge base is based on the comparison.

15. The computer-implemented method of claim 13, wherein maintaining the knowledge base of the plurality of facts further comprises:

determining a number of the one or more facts from the plurality of facts of the knowledge base that reverses the generated candidate prediction for the new fact candidate when removed; and based on comparing the number with one or more thresholds, displaying the one or more facts from the plurality of facts of the knowledge base to a user, wherein including the new fact candidate in the knowledge base is based on user input after the user reviews the displayed one or more facts.

16. The computer-implemented method of claim 1, wherein the new fact candidate is a triple comprising three elements, wherein one of the three elements of the triple is omitted.

17. The computer-implemented method of claim 1, further comprising:

determining a ranked list based on the one or more facts from the plurality of facts of the knowledge base that reverses the generated candidate prediction for the new fact candidate when removed, and wherein maintaining the knowledge base of the plurality of facts is based on the ranked list.

18. The computer-implemented method of claim 1, wherein determining the one or more facts from the plurality of facts of the knowledge base that reverses the generated candidate prediction for the new fact candidate when removed is based on dot products associated with gradients of the candidate prediction.

\* \* \* \* \*